(12) United States Patent
Anderson et al.

(10) Patent No.: US 9,953,011 B1
(45) Date of Patent: Apr. 24, 2018

(54) DYNAMICALLY PAGINATED USER INTERFACE

(71) Applicant: Amazon Technologies, Inc., Reno, NV (US)

(72) Inventors: Ryan Edward Anderson, Blacksburg, VA (US); Michael Frederick Masterman, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 344 days.

(21) Appl. No.: 14/038,527

(22) Filed: Sep. 26, 2013

(51) Int. Cl.
*G06F 17/00* (2006.01)
*G06F 17/21* (2006.01)

(52) U.S. Cl.
CPC .................................. *G06F 17/217* (2013.01)

(58) Field of Classification Search
CPC .................................................... G06F 17/217
See application file for complete search history.

(56) References Cited

U.S. PATENT DOCUMENTS

| | | | | |
|---|---|---|---|---|
| 8,326,835 | B1* | 12/2012 | Munter | G06F 17/30994 707/737 |
| 9,400,847 | B1* | 7/2016 | DeHaven | G06F 17/3089 |
| 2004/0003096 | A1* | 1/2004 | Willis | G06F 17/30702 709/228 |
| 2005/0065856 | A1* | 3/2005 | Roberts | G06Q 10/087 705/27.1 |
| 2007/0079236 | A1* | 4/2007 | Schrier | G06F 17/217 715/206 |
| 2007/0150368 | A1* | 6/2007 | Arora | G06Q 30/02 705/26.1 |
| 2008/0021811 | A1* | 1/2008 | Brader-Araje | G06Q 30/0625 705/37 |

(Continued)

OTHER PUBLICATIONS

Yogev Ahuvia, Infinite Scrolling: Let's Get to the Bottom of This, Smashing Magazine, http://uxdesign.smashingmagazine.com/2013/05/03/infinite-scrolling-get-bottom/, retrieved on Sep. 3, 2013.

(Continued)

*Primary Examiner* — Scott Baderman
*Assistant Examiner* — Matthew G McVicker
(74) *Attorney, Agent, or Firm* — Knobbe Martens Olson & Bear LLP

(57) ABSTRACT

Systems and associated processes for generating user pagination preference data and using that data to generate and/or present network pages are described herein. These systems and processes can dynamically collect data representing a user's preference respecting specific layout determination factors, and can store this data in association with the user. The systems and processes can also make use of that data to provide the user with a personalized user interface which will provide the user with a page layout tailored to that specific user's browsing habits. Moreover, data representing the attributes of the requested content or the user device may further contribute to generating a page layout which optimally displays the requested content to the user. Accordingly, user pagination preference data can potentially both present a more satisfying user interface and elicit more item purchases than existing pagination systems in some embodiments.

25 Claims, 6 Drawing Sheets

(56) References Cited

U.S. PATENT DOCUMENTS

| | | | | |
|---|---|---|---|---|
| 2012/0078731 A1* | 3/2012 | Linevsky | ........... | G06Q 30/0277 |
| | | | | 705/14.73 |
| 2014/0019307 A1* | 1/2014 | Guardalben | ....... | G06Q 30/0641 |
| | | | | 705/27.1 |
| 2014/0215321 A1* | 7/2014 | Damera-Venkata | .. | G06F 17/217 |
| | | | | 715/244 |

OTHER PUBLICATIONS

Ken Shi, 15 Fantastic Grasemonkey Scripts for Better Browsing, Appstorm, http://web.appstorm.net/roundups/browsers/15-fantastic-greasemonkey-scripts-for-better-browsing/, retrieved on Sep. 3, 2013.

* cited by examiner

DYNAMICALLY PAGINATED USER INTERFACE

BACKGROUND

Networked systems have become an increasingly prevalent and vital technology. Networks, such as the Internet, allow large numbers of computer systems and people to swiftly transfer data across the globe. These networks are often used to provide network applications, such as web applications and mobile applications, to end users. These web and mobile applications are often hosted by server computers that serve content to end user devices.

To make navigation of network applications easier, network browsers have been developed. A network browser is a program-based graphical user interface, and is typically a program installed on a user device. Users of client computing devices can execute network browsers to retrieve and interact with content from content providers, submit information to content providers and other network-accessible entities, and communicate with other users of client computing devices. Network browsers typically provide various tools and features that may be used to facilitate interaction with content. For example, browsers may paginate requested content, or divide the content into discrete network pages, in order to facilitate user navigation of the requested content in only limited amounts at a time.

BRIEF DESCRIPTION OF THE DRAWINGS

Throughout the drawings, reference numbers are re-used to indicate correspondence between referenced elements. The drawings are provided to illustrate embodiments described herein and not to limit the scope thereof.

DETAILED DESCRIPTION

I. Introduction

Figure 1:
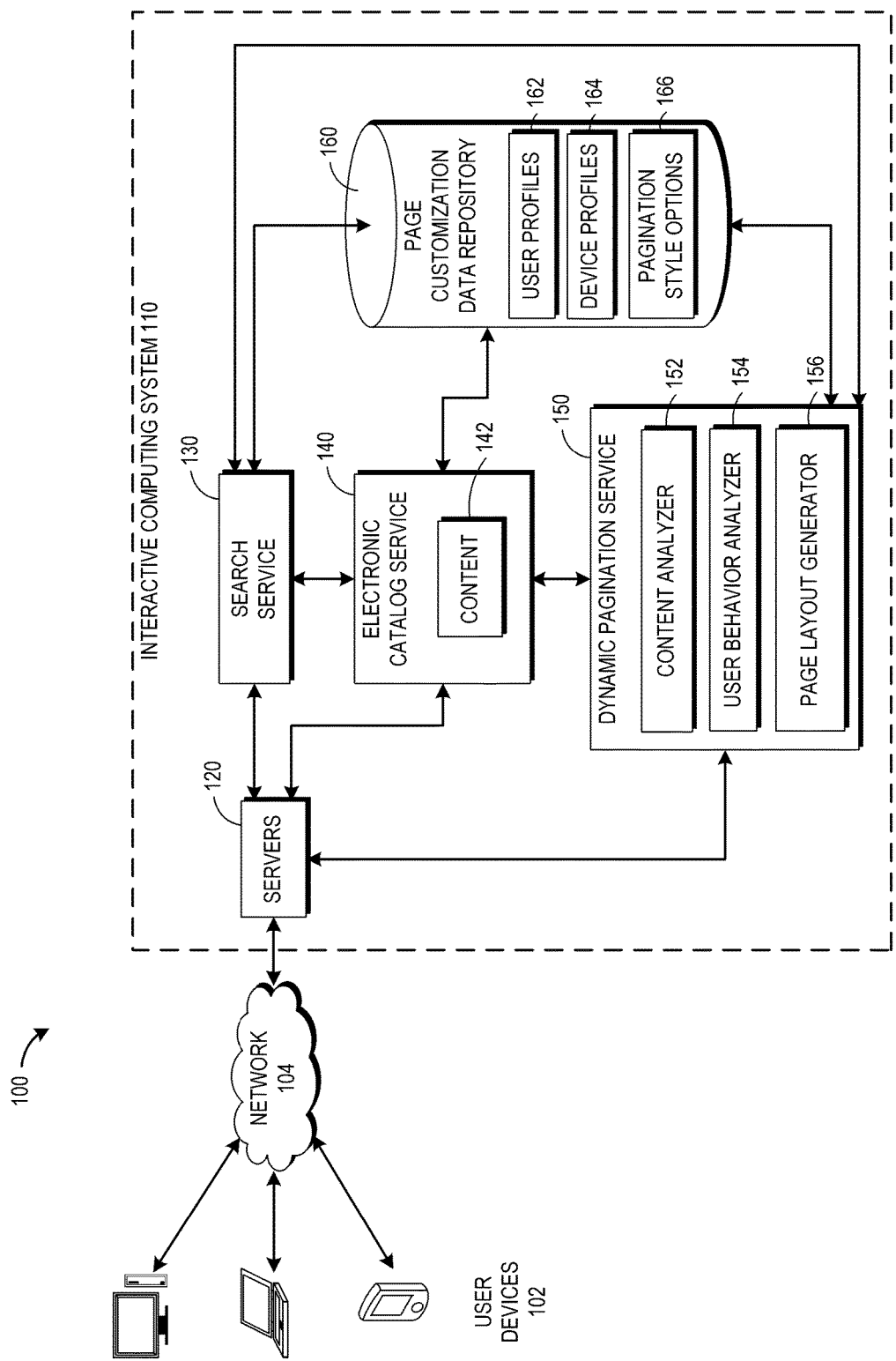
FIG. 1 illustrates an embodiment of a network environment for providing users with access to an interactive computing system capable of generating dynamically paginated network pages.

From the perspective of a user utilizing a client computing device, a user experience may be impacted by the presentation of network content obtained over a communication network, such as when browsing or searching through the content of an electronic catalog. However, content presentation in the user interface of a network browser is somewhat static. Specifically, the amount of content presented, and the manner in which that amount of content is presented on a network page, may affect the browsing experience of the user. For example, the browsing habits of different users of the electronic catalog may be accommodated by different pagination styles, such as infinite scrolling or numbered pages, and may also be accommodated by display of different amounts of content, such as the number of items in the electronic catalog, which are presented together.

This disclosure describes systems and associated processes for selecting a page layout and generating a network page according to the page layout, among other things. These systems and processes can provide dynamically customized network pages to users in certain embodiments by accessing page customization data. The page customization data may include one or more of user pagination profiles, pagination style options, and device pagination profiles. In some embodiments, user pagination profiles, which may include user behavioral data such as past user interaction with pagination options, may be used to identify a page layout and present a network page to the user according to the page layout.

For example, some users of an electronic catalog may typically browse through large numbers of items, or, when presented with segmented content, may select an option to view all of the content on one network page. Such users may desire to be presented with greater numbers of items from the electronic catalog. Accordingly, an infinite scrolling (e.g., rendering a first amount of content that fits within one "page" and automatically outputting additional content as the user scrolls) page layout may be selected for the user in response to the user's browsing behavior indicating a preference for browsing large quantities of content at a time. Other users may typically search for information on a specific type of item, and such users may want to be presented with a network page containing fewer items that are highly relevant to the search. Accordingly, a custom page layout can be selected that includes only a subset of the search results that are associated with a relevance score indicating a higher quality of search results. In yet other embodiments, a custom page layout may be selected by accessing information regarding attributes of requested content. Page layouts such as these may enable the user to have a more enjoyable browsing experience by tailoring the presentation of content to programmatically perceived user preferences.

For purposes of illustration, the processes disclosed herein are described primarily in the context of an interactive computing system that presents users with items in an electronic catalog or catalog system, such as products and services, and also develops user pagination profiles based on user behavior while browsing the items in the electronic catalog. The interactive computing system can be implemented as a network application, which may be a network site (e.g., a web site), a mobile application, a combination of the same, or the like. As will be apparent, the disclosed processes can also be used in other types of systems, and can be used to guide generation of network pages containing information regarding other types of content, such as but not limited to searches, news, real estate, social networking content, images, or video.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. Further, not necessarily all advantages described herein are shared by every embodiment of this disclosure.

II. Interactive Computing System Overview

Prior to describing embodiments of dynamic pagination functionality in detail, an example computing system in which this functionality can be implemented will be described. Referring to FIG. 1, an embodiment of a network environment 100 is depicted that can provide users with access to an interactive computing system 110 for the purpose of providing users with access to an electronic catalog of items. Users can browse or search the electronic catalog to find items to purchase or otherwise acquire, among other features. In the environment 100, users can access the interactive computing system 110 with user devices 102. An electronic catalog service 140 of the interactive computing system 110 can provide a graphical user interface displaying some or all items, for example, items output in response to a search request or a browsing request. A dynamic pagination service 150 of the interactive computing system 110 can provide a dynamically selected page layout for the graphical user interface. Advantageously, in certain embodiments, the dynamic pagination functionality of the dynamic pagination service 150 can present network pages that are more useful for the individualized browsing behavior of users interested in the items.

The user devices 102 that access the interactive computing system 110 can include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming platform, set-top box, television configured with network access and program execution capabilities (e.g., "smart TVs"), or some other electronic device or appliance. The user devices 102 access the interactive computing system 110 over a network 104, which can be any wired network, wireless network, or combination thereof. In addition, the network 104 may be a personal area network, local area network, wide area network, cable network, satellite network, cellular telephone network, or combination thereof. For example, the communication network 104 may be a publicly accessible network of linked networks, possibly operated by various distinct parties, such as the Internet. In some embodiments, the communication network 104 may be a private or semi-private network, such as a corporate or university intranet. The communication network 104 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The interactive computing system 110 can be implemented with one or more physical servers or computing machines, including the servers 120 shown (among possibly others), which may be geographically dispersed or co-located. Thus, each of the components depicted in the interactive computing system 110 can include hardware and/or software for performing various features. In one embodiment, the interactive computing system 110 is a network site or a collection of network sites, which serve network pages to users. In another embodiment, the interactive computing system 110 hosts content for one or more mobile applications or other applications executed by the user devices 102. For ease of illustration, this specification often refers to graphical user interfaces in the network site context. However, it should be understood that these user interfaces can be adapted for display in mobile applications or other applications other than a browser.

The processing of the various components of the interactive computing system 110 can be distributed across multiple machines, networks, or other computing resources. For example, the features and services provided by the interactive computing system 110 may be implemented as web services consumable via the network 104. The various components of the interactive computing system 110 can also be implemented in one or more virtual machines or a hosted computing environment, rather than in dedicated servers. The hosted computing environment may include one or more rapidly provisioned and released computing resources, which computing resources may include computing, networking and/or storage devices. A hosted computing environment may also be referred to as a cloud computing environment. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

In one embodiment, the user devices 102 communicate with the servers 120 of the interactive computing system 110. These servers 120 can access back-end computing devices, which may implement the other functionality of the interactive computing system 110 shown. Other computing arrangements and configurations are also possible, as described above.

The interactive computing system 110 may include a catalog service 140 and a search service 130 in the depicted embodiment. Users can browse content 142 provided by the catalog service 140 or query the search service 130 to obtain information about the electronic catalog content 142. The content 142 may include a plurality of items, which may be products or services available for purchase or selection through the electronic catalog service 140. In one embodiment, these items can include items other than (or in addition to) applications, such as media (books, audio, video, etc.), clothes, electronics, and appliances, to name a few. The electronic catalog content 142 can include detailed information about these products as well as services. In one embodiment, this content 142 is arranged in a hierarchical structure, having items associated with one or more categories or browse nodes in a hierarchy (or graph). The catalog service 140 can provide functionality for users to browse the item hierarchy in addition to searching the catalog. For example, users may be able to select an option to view all items within a certain category, and may further limit the items presented by selecting subcategories. Users can select an item represented in the hierarchy or in a list of search results to see more details about an item. In response to a user item selection, the server 120 can provide to a user device 102 a network page that includes details about the selected item (sometimes called an "item detail page").

Items in the electronic catalog content 142 can be arranged hierarchically, with a general items (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category, which is in turn part of a broader category still, and so on, up and until the root node. Categories can be arranged in a flat structure instead of a hierarchical structure in some embodiments. Similarly, an electronic catalog may have a graph data representation instead of a hierarchical, tree-based representation.

The interactive computing system 110 can also include a dynamic pagination service 150 that enables users to review items in the electronic catalog. Although the dynamic pagination service 150 is illustrated as being a separate component, in some embodiments the dynamic pagination service 150 may be incorporated into the electronic catalog service 140 and/or the search service 130. In the depicted embodiment, the dynamic pagination service 150 includes a content analysis component 152, a user behavior analysis component 154, and a page layout generation component 156. As described above, each of these components can be implemented in hardware and/or software.

The dynamic pagination service 150 may receive a user request for content, for example, in response to a keyword search request from the search service 130 or in response to a categorical browsing request from the electronic catalog service 140. The content analysis component 152 may analyze requested content that may be a subset of the content 142 in the electronic catalog, to identify content attributes. The content attributes may include a category or categories associated with the items in the content, a number of items in the requested content, and a likelihood of a user purchasing multiple items of the items included in the requested content. In some embodiments, another content attribute may include common browsing preferences of users with respect to the requested content.

The user behavior analysis component 154 can analyze the behavior of a user with respect to an electronic catalog to collect and store data representing the pagination preferences of the user while browsing different types of content. In some embodiments, the behavior analysis component 154 may also analyze the behavior of the user with respect to other systems connected to the electronic catalog via the network 104. The behavior of the user can include both explicit and implicit cues as to what pagination styles the user may find appealing. This pagination preference data can be stored in a user profile 162 in a page customization data repository 160 for later use in identifying an appropriate page layout for presenting a network page to the user.

The page layout generation component 156 can generate a dynamically paginated network page for output to a user. The page layout generation component 156 can receive input from the content analysis component 152 and the user behavior analysis component 154 regarding layout determination factors, and may use data from the page customization data repository 160 to generate a page layout based on the layout determination factors. The page layout may include a selected pagination style and an amount of requested content to display in the pagination style, and may also include user interface elements to present to the user. The selected amount of requested content and the user interface elements may be arranged for presentation according to the selected pagination style on the dynamically paginated network page. The pagination style, the amount of requested content to display, and/or the user interface elements may be selected based on one or more layout determination factors.

In some embodiments, more than one pagination style may be selected for a given user based on the type of content presented to the user. For example, on a network page including both search results and a set of recommended items, the search results may be arranged according to a first pagination style, and the set of recommended items may be arranged according to a second pagination style. The pagination style or styles may be selected from the pagination style options 166 in the page customization data repository 160.

There are many different types of pagination styles that may be selected from the pagination style options data 166 by the page layout generation component 156. One pagination style may be segmented pagination. Segmented pagination can include dividing the requested content into smaller sequential subsets of the requested content that will fit on one "page" of the user interface of a requesting browser, outputting these subsets on sequential pages, and presenting the user with navigation options such as a page index and selectable options to view a previous or a next page. This pagination style can divide large amounts of content into segments that are more manageable for the user to read, as well as conveying information to the user about the overall size of the content and how much content is left versus how much content the user has already viewed. The page layout generation component 156 may select segmented pagination as the pagination style, for example, in response to a layout determination factor of user browsing behavior indicating a preference for browsing both forward and backward through discrete pages of requested content. The page layout generation component 156 can also dynamically modify the number and size of items presented on one page based on user pagination preferences accessed from the user profile 162 in the page customization data repository 160.

Another pagination style may be infinite scrolling. Infinite scrolling may render a first amount of content that fits within one "page" of the user interface of a requesting browser, and may automatically output additional content that is appended to the first amount of content, as the user scrolls past the content displayed at an edge of the user interface. Infinite scrolling can allow the user to browse a large number of items relatively quickly and allows a user to maintain the view of previous "pages" of content as new pages are loaded. As an example, the page layout generation component 156 may select infinite scrolling in response to a layout determination factor of user browsing behavior indicating a preference for browsing large quantities of content at a time, or in response to a layout determination factor of the user device 102 being a mobile device.

A related pagination style 166 may be modified infinite scrolling, which can load one page of content and, instead of automatically loading additional content, presents the user with a selectable option for more content to be loaded onto the page in a similar manner to infinite scrolling. With both infinite scrolling and modified infinite scrolling, the page layout generation component 156 may dynamically adjust the amount of additional content loaded upon each subsequent user request (e.g., scrolling to or past the edge of the user interface or selecting an option for more content) based on previous requests stored in the user profile 162. For example, the first time a user requests additional content, the page layout generation component 156 may output a predetermined number of additional items. If the user makes a second request for additional content within a threshold timeframe, the page layout generation component 156 may increase the number of additional items to be output upon the current or subsequent user requests. In some embodiments, if the device bandwidth changes (for example, with fluctuating signal strength of a satellite network accessed by a mobile device) then the page layout generation component 156 may decrease the number of additional items to be output upon the current or subsequent user requests.

Yet another pagination style may be a content carousel. A content carousel may present a horizontally-oriented display of images or image thumbnails, wherein previous and subsequent images may appear stacked under a current image, and can have left and right navigation options. Some embodiments may be provided with sideways scrolling options in addition to or instead of left and right navigation options. For example, a user may be able to swipe sideways with a finger or stylus to browse items of a content carousel presented on a touch sensitive display. When a user scrolling through the content displayed in a content carousel reaches a last item, some embodiments of the content carousel may cycle back to the first item, presenting a seamless infinite carousel, and other embodiments of the content carousel may end. As an example, the page layout generation component 156 may select a content carousel as the pagination style in response to a layout determination factor of user browsing behavior indicating a preference for browsing small quantities of content in one browsing session. A content carousel may also be selected for small quantities of secondary content.

Some or all of the above pagination styles may employ threaded pagination to display a group of related items together. Threading is a form of pagination that visually groups related items. For example, multiple colors, sizes, versions, or formats of an item may be displayed together or otherwise visually associated within content presented to a user. Such related items may be arranged near each other, in a hierarchy, or in a group. For complex or varied content, this may advantageously aid the user in identifying related items or variations of an item. As another example, where an item is available in multiple formats or versions, such as a computer game available for multiple platforms, the formats or versions may be threaded so that a user may easily browse and select the version compatible with the user's gaming devices. In some embodiments, the user may be able to browse the threaded items in a separate pagination style from the pagination style selected to present the overall content.

Data describing at least the above-described pagination styles may be stored in the pagination style options 166, and may be accessed by the page layout generation component 156 to select a pagination style based on one or more layout determination factors. The layout determination factors can include one or more content attributes and/or one or more user pagination preferences stored in the user profiles 162. A layout determination factor may be associated with a corresponding pagination style. In some embodiments, the page layout generation component 156 may apply a weighted formula to select a page layout based on a plurality of layout determination factors. Some or all of the plurality of layout determination factors may be associated with one of a plurality of a corresponding pagination styles, and equal or different weights may be assigned to each of the plurality of corresponding pagination styles in order to determine a most heavily weighted pagination style. The most heavily weighted pagination style may be selected for the page layout. In some embodiments, a pagination style corresponding to a layout determination factor accessed from a device profile 164 may be weighted more heavily than a pagination style corresponding to either a layout determination factor accessed from a user profile 162 or a layout determination factor relating to a content attribute.

The layout determination factors may also include data accessed from a device profile 164 stored in the page customization data repository 160. The device profile 164 may describe attributes of the user device 102 requesting the content. Each attribute may be a separate layout determination factor, and may be associated with a corresponding pagination style. Device attributes may include the type of device, the display resolution or screen size, device bandwidth, and a type of network connection. For example, the user device 102 may be a mobile computing device such as a smartphone, or may be a non-mobile computing device such as a laptop. Non-mobile computing devices such as desktop computers and laptop computers typically have faster computing speed and access to faster network connections than mobile computing devices. As a result, in the same timeframe, more content may be delivered at once to a network browser on a non-mobile computing device (a "non-mobile browser") than to a network browser or application on a mobile device (a "mobile browser"). Further, mobile computing devices may have data transfer limitations as a result of a mobile service subscription plan, and therefore it may be desirable from the user perspective to have less content delivered at a time to a mobile browser. Non-mobile computing devices also generally have larger displays than mobile computing devices, and therefore more content may be presented at once in the user interface of a non-mobile browser than in the user interface of a mobile browser.

In addition to selecting a pagination style and an amount of requested content, the page layout generation component 156 may select one or more user interface elements to present to the user on the dynamically paginated network page. The user interface elements may include one or more of a selectable option for more content, left and right navigation options, or a selectable page index. Other types of indices may also be output by the page layout generation component 156. For example, it may be challenging for a user to navigate backward through large amounts of items presented according to infinite scrolling pagination. In addition, a user may wish to view information about an item at the end of a list of search results paginated through infinite scrolling, but may not want to load all results in the list to view the desired item. Therefore, the page layout generation component 156 may present an index, which remains on the page even as the user scrolls through search results. If the items are arranged alphabetically, the index may be alphabetical, and may include markers for each letter. If the items are arranged by relevancy, the index may be numerical, with markers of numbers representing a range of the search results. Each marker in the index may be associated with a position, such as a vertical or horizontal position, of a corresponding item or first item within the marked category. When the user selects a marker, the page layout generation component 156 may load one page of the items associated with the marker and may append such items to the currently displayed items. In some embodiments, this may be accomplished without loading the content in between the currently displayed items and the items associated with the marker. As the user continues to scroll, such "in between" content may be loaded above, below, or to the side of currently displayed items, dependent upon the direction of scrolling.

The page layout generation component 156 can also output a selectable user interface element that enables a user to change one or more features of the page layout. Optionally, this feature may be omitted. However, providing a user with the selectable change pagination element may provide helpful information for building a map of user pagination preferences. For example, the selectable change pagination element may allow the user to select a preferred pagination style from a plurality of available pagination styles, to adjust the amount of content presented at once or the total amount of content presented, to add or remove user interface elements, or to rearrange the components of the page layout. In some embodiments, the page layout change option may allow the user to dynamically adjust the amount of content presented at once, for example, by resizing item image thumbnails and/or changing the set of information presented with each item, such as price, title, or rating. User input from the selectable change pagination element may be stored in association with the user in one of the user profiles 162.

These are just a few examples of the many dynamic pagination features that are compatible with embodiments described herein. Additional example features of the dynamic pagination methods and user interfaces are described in greater detail below. For purposes of illustration, many of the examples herein are described in the context of keyword searching for items an electronic catalog. However, it should be understood that these examples can be adapted to categorical browsing of an electronic catalog, as described above, or to user interaction with other types of network systems.

III. Pagination Preference Identification Overview

Figure 2:
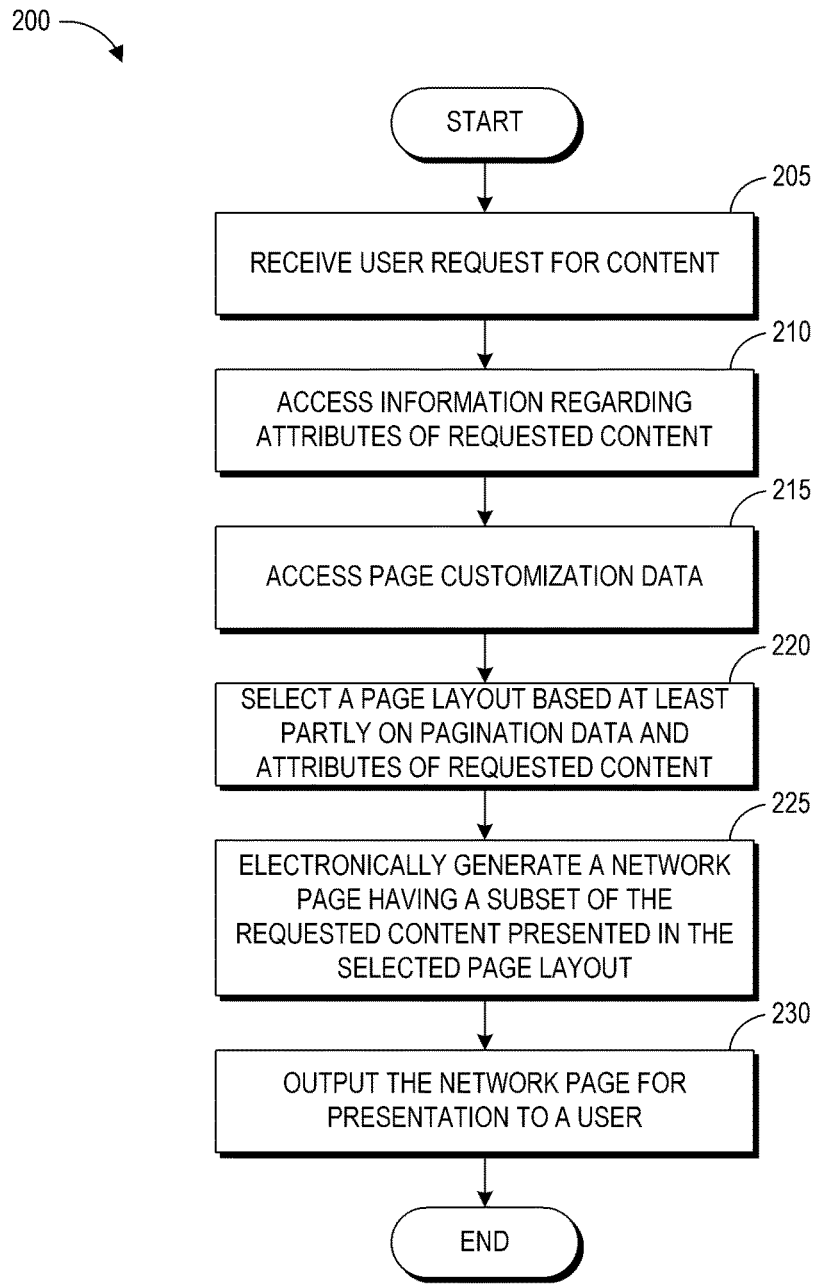
FIG. 2 illustrates a flow diagram of one embodiment of a content-based dynamically paginated user interface generation process.

FIG. 2 illustrates an overview embodiment of a dynamic pagination process 200. Any computing device can implement the process 200. For ease of illustration, however, the process 200 is described as being implemented by the interactive computing system 110, and in particular, the dynamic pagination service 150.

At block 205, the dynamic pagination service 150 receives a user request for content. For example, the user request may be generated by a user keyword search performed by the search service 130 or by categorical browsing of the content of the electronic catalog service 140. Accordingly, the requested content may include a plurality of items in the electronic catalog.

At block 210, the content analysis component 152 can access information regarding attributes of the requested content. For example, in the context of an electronic catalog, the attributes may be one or more of a category or categories associated with the plurality of items of the requested content, data regarding sellers of the plurality of items, purchase statistics, or patterns of general user browsing behavior with respect to the plurality of items. At block 215, the page layout generation component 156 accesses page customization data. The page customization data may include a plurality of pagination style options, and in some embodiments the page customization data may include an association of some or all of a plurality of content attributes with a corresponding pagination style. In some embodiments, the content analysis component 152 can access the user profile data, and the user profile data may include a seller persona for a seller of a subset of the items. For example, a used media seller persona may indicate a low inventory of items with a high uniqueness. The used media seller persona may be associated, in some embodiments, with a pagination style of carousel. A new electronics seller persona may indicate a large inventory with many of each item available, and may be associated, in some embodiments, with a pagination style of segmented pagination. Accordingly, page layouts displaying items of sellers of the electronic catalog, the sellers having a predefined type of content available for purchase or selection, may be selected based on the seller persona.

The page layout generation component 156 selects, at block 220, a page layout based at least partly on the page customization data and the attributes of the requested content. The page layout generation component 156 may select the page layout based on one or more of the content attributes, and may weight a plurality of content attributes to select the page layout. As discussed above, the page layout may include a selected pagination style, a subset of the requested content to display per page, and user interface elements relating to pagination and navigation. In some embodiments, the page layout may also include a subset of the total requested content that will be presented to the user over all pages in the user interface. For example, requested content including search results may be associated with a relevance score indicating the quality of the search results. The relevance score may be based on the commonness of keywords used for conducting the search. If the relevance score is high, fewer search results may be selected for presentation to a user, and conversely if the relevance score is low then more search results may be selected for presentation to the user.

To illustrate, the content may include a plurality of items from the electronic catalog, and content attributes may include a category of all, a majority, or a threshold percentage of the items. This approach may be implemented, in some embodiments, when the user request is generated by categorical browsing of the electronic catalog. For example, respecting a category of apparel, purchase statistics may indicate a high influence of item images in user purchasing decisions of apparel items, and a general user behavior of browsing many apparel items instead of searching specifically for just one item. Accordingly, the category of apparel may be associated with a pagination style of infinite scrolling of item thumbnails, and may be associated with data indicating a preference to display a large number of item thumbnails per page. Each category in the hierarchy of items in the electronic catalog may be associated with one or more of the pagination styles based on common attributes of items in the category, purchase statistics of items in the category, or on common user browsing behavior with respect to items in the category.

At block 225, the page layout generation component 156 can electronically generate a network page having a subset of the requested content presented in the page layout. The network page may include the subset of the requested content arranged according to the selected pagination style, and may also include any user interface elements, such as an index or navigation options. At block 230, the network page may be output for presentation to a user, for example, in a mobile browser, mobile application, or non-mobile browser.

IV. Pagination Preference Identification Overview

Figure 3:
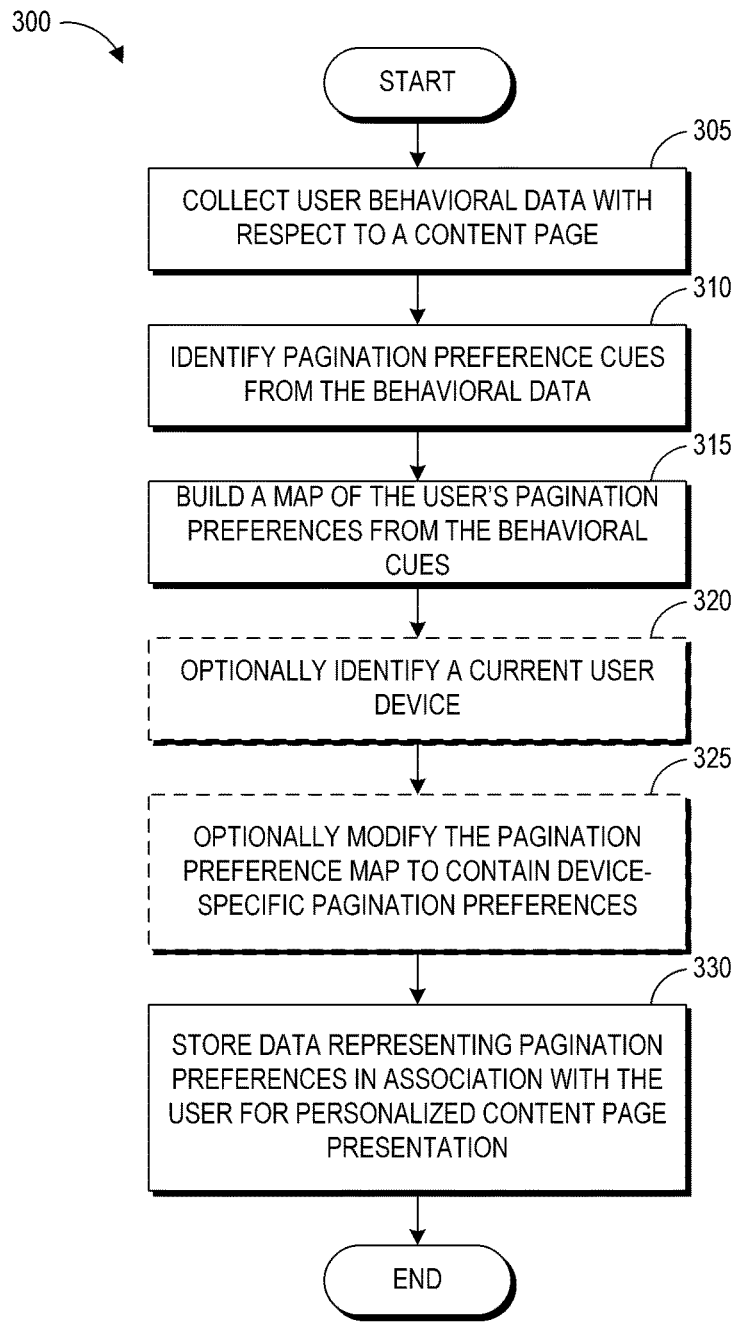
FIG. 3 illustrates a flow diagram of one embodiment of a pagination preference identification process.

FIG. 3 illustrates an overview embodiment of a pagination preference identification process 300. As described above, a user's preference for certain pagination styles, content amounts, or user interface elements may be identified through the user's behavior with respect to the electronic catalog. The user's pagination preferences may be identified through the user's behavior with respect to other networked systems as well. More generally, the user's pagination preferences can be inferred through user interactions with one or more network pages on any network site. The process 300 can identify the user's preferences and store data representing such preferences in association with the user for later use in customizing pagination to the user's preferences. Any computing device can implement the process 300. For ease of illustration, however, the process 300 is described as being implemented by the interactive computing system 110, and in particular, the user behavior analysis component 154.

At block 305, the user behavior analysis component 154 receives information regarding a user's behavioral data with respect to an electronic catalog, such as the catalog service 140 of FIG. 1. This information may be based on explicit cues and/or implicit cues in the user's behavior regarding what page layouts appeal to the user. For example, explicit cues may be inferred from user pagination selection behavior. In some embodiments, explicit cues may include user requests for additional pages of content, user requests to show more or less content at a time, or any pagination modification made through a selectable change pagination option. To illustrate, the user behavior analysis component 154 can determine from a user profile that the user may frequently selects the "view all" option when browsing items. This may be an explicit cue for a pagination preference of viewing a large number of items on one page, which may be associated with a pagination style of infinite scrolling or modified scrolling.

Implicit cues, in some embodiments, can be inferred from user interaction with an item, for example, by identifying a user selecting an item for viewing or for purchase, or by identifying user patterns of item browsing. For example, an example of an implicit cue could be a click history of items selected by the user. A correlation between the user's click history, or the user's order history, and a page layout of a set of browsed items may be an implicit cue as to a pagination preference for the page layout of selected or ordered items. To illustrate, a user may browse telescopes in the electronic catalog on a number of different occasions, and may be presented with multiple page layouts. By accessing a current session log or a browsing history from the use profile 162 in the page customization data repository 160 of FIG. 1, the user behavior analysis component 154 can determine that the user more often selects or purchases telescopes returned as search results, when presented with telescope thumbnail images accompanied by price and a user-generated rating arranged in segmented pagination style. This may be an implicit cue as to the user's preference for navigating through discrete pages of items and for being presented with some information about the item in the paginated user interface prior to selecting the item.

As another example, user behavior analysis component 154 can determine that a user scrolls quickly through the first ten items of a set of recommended items and is more likely to select a recommended item than an item returned in response to a keyword search. This may be an implicit cue as to the user's preference for a carousel-style offering of recommended items combined with search results. As yet another example, the user behavior analysis component 154 can infer user pagination preferences from user patterns of item browsing. One example of such a pattern identified by the analysis component 154 may be that a user stops browsing items (such as shoes) when items of a different color are presented. The user's action of not browsing (e.g., by not selecting another page in a set of results or not scrolling down any further) may be an implicit cue as to the user preferring a certain color. The dynamic pagination service may exclude any items not matching that color, or may present such items later or less prominently within the set of paginated items. Further, an average relevance score of the user's search results may be an implicit cue as to the number of search results with which a user may prefer to be presented. More generally, the user behavior analysis component 154 can identify trends or patterns among items the user has selected (e.g., for viewing or purchase) when presented with a certain type of item in a certain style of pagination. A user may express different pagination preferences for different types of items. Explicit and implicit cues, as well as other cues not expressly discussed, can indicate what page layouts the user prefers.

Accordingly, at block 310, the user behavior analysis component 154 analyzes the explicit and/or implicit cues in the user's behavioral data to identify specific pagination preferences of the user. In one embodiment, the user behavior analysis component 154 may rely solely on either explicit or implicit cues to identify user pagination preferences. In another embodiment, explicit and implicit cues may be analyzed together to identify user pagination preferences. In some embodiments, the user behavior analysis component 154 may use the behavioral data to associate the user with a digital persona or profile stored in computer storage. The persona may be associated with a plurality of pagination preferences that may in some embodiments be determined based on the behavior of a population of other users also associated with the persona. More generally, a persona can include data representing the aggregate or common pagination preferences of a plurality of users. The user behavior analysis component 154 may also associate multiple personas with a user, which may reflect different pagination preferences of the user in different browsing situations.

In some embodiments, the user behavior analysis component 154 may use information other than user behavior, such as user account information, to associate the user with a persona and/or a pagination preference. In some instances that use account information to determine pagination preferences, block 305 of the process 300 may be optional. For example, user account information may provide demographic information regarding the user, and the user behavior analysis component 154 may use to determine a pagination preference. As another example, an email service provider of the email account used by the user to create an account in an electronic catalog may typically employ a particular style of pagination, and the user behavior analysis component 154 may set that style of pagination as a default pagination preference of the user. To illustrate, some email providers employ threaded messaging, displaying a group of related emails together. The user behavior analysis component 154 may determine from the user's email address domain (e.g., examplemailservice.com) that the user has a pagination preference for threaded content (or some other type of pagination particular to the user's email provider).

At block 315, the user behavior analysis component 154 builds a map of the user's pagination preferences based on the analysis of the explicit and/or implicit behavioral cues. Data representing individual page layout components for which the user behavior analysis component 154 determined the user's behavior indicated a preference may be merged together into a larger set of data, which can be stored as a map, table(s), or other data type(s). For convenience, the remainder of this specification will refer to the set of data as being stored as a map, although other data types may be used. In one embodiment, if the behavioral data indicates that the user expressed a pagination preference, the user behavior analysis component 154 may access the pagination style options 166 in the page customization data repository 160 to compare the user's behavioral data to a known list of pagination styles. The user behavior analysis component 154 may weight a plurality of user behavior factors to determine a preferred pagination style, a preferred amount of content per page, and preferred user interface elements. In some embodiments, such a preferred page layout may be stored in association with the user. In other embodiments, a plurality of such preferred page layouts may be stored in association with the user, for example, with each page layout preference mapped to a specific type of content or network page.

Optionally, at block 320, the user behavior analysis component 154 may identify a user device currently being used to access the interactive computing system 110. As discussed above, device attributes may have ramifications in selecting the page layout most suitable for presenting content to the user. In some embodiments, the user behavior analysis component 154 may determine device attributes from interaction with the device, for example, by determining bandwidth from latency in communications with the device, or determining a currently used browser or application. The user behavior analysis component 154 may alternatively or additionally, in some embodiments, access data stored in device profiles 164 in the page customization data repository 160 to ascertain qualities or attributes of the user device. For example, the device profiles 164 may include data regarding display resolution, screen size, bandwidth capabilities, processing speed, program capabilities, plugin options, and network capabilities of each of a plurality of devices. Device profiles 164 may also include performance statistics of browser or application options, for example, Ajax-based retrieval performance, or user interface design preferences of developers of an application. The user behavior analysis component 154 may use the data in the device profile in combination with data gathered from interacting with the user device in order to determine device attributes.

Optionally, at block 325, the user behavior analysis component 154 may adjust the pagination preference data in the map to obtain an enhanced map of the user's pagination preferences. In one embodiment, the pagination preferences data may be adjusted based on device attributes. For example, a set of device attributes may pertain to one or more pagination preferences expressed by the user, but not to other pagination preferences, and the user's pagination preferences data may be adjusted to reflect this limitation. To illustrate, the user's behavioral data may indicate a preference for viewing telescopes in a segmented pagination style with an item detail summary presented together with an item thumbnail. The user behavior analysis component 154 may determine that the mobile device attributes of a relatively small display size and limited network connection are relevant to the amount of information presented together with the item thumbnail, and the pagination style may be switched to a vertical infinite scroll as well. The map of the user's pagination preferences may be structured in a manner that reflects device-specific pagination preferences.

At block 330, the user behavior analysis component 154 stores the map of data representing the user's pagination preferences in association with the user (e.g., in association with a profile of the user). This pagination preference data may be stored in the user profiles 162 of the page customization data repository 160 of FIG. 1. Later access to the stored pagination preferences data may be beneficial for personalizing the pagination of network pages presented to the users.

V. Behavior-Based Dynamic Pagination Overview

Figure 4:
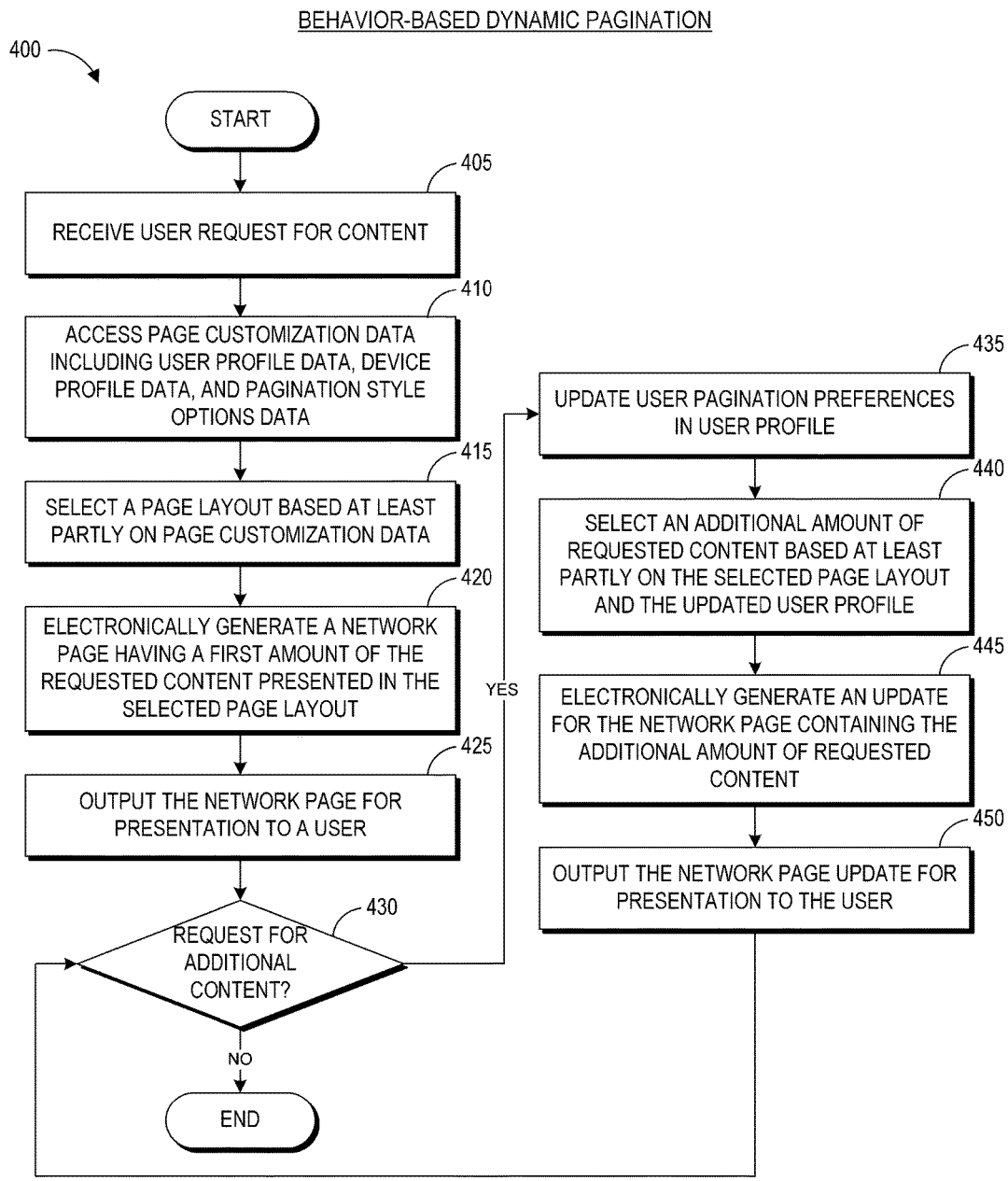
FIG. 4 illustrates a flow diagram of one embodiment of a behavior-based dynamically paginated user interface generation process.

FIG. 4 illustrates an embodiment of a behavior-based dynamic pagination method 400. When searching for or browsing items in an electronic catalog such as the catalog service 140 of FIG. 1, the arrangement of the user interface used to present the items can impact the user's enjoyment of the browsing experience and also the likelihood that the user will select or ultimately purchase an item. The behavior-based dynamic pagination method 400 can make use of pagination preference data associated with a user to present items in a visually pleasing and helpfully organized manner that is personalized according to the user's implicit and/or explicit cues as to pagination preferences. While any computing system can implement the process 400, the process 400 is described as being implemented by the review dynamic pagination service 150 of FIG. 1.

The behavior-based dynamic pagination method 400 can be initiated at block 405 in response to receiving a user request for content. For example, a user may generate a content request by keyword searching items in the electronic catalog, categorically browsing the electronic catalog, or by browsing the store or items of specific sellers of the electronic catalog. In response to the specific type of user content request, the process 400 can identify a plurality of relevant items as the requested content.

At block 410, the page layout generation component 156 accesses page customization data including one or more of user profile data, device profile data, and pagination style data. The user profile data may include one or more user pagination preferences expressed through interaction with the electronic catalog and the device profile data may include one or more device attributes, as discussed above with respect to FIG. 3. In some embodiments, for example, if little or no information is known about a current user's pagination preferences, population data may be used in place of a profile of preferences for that user. The population data may include personas of users and pagination preferences associated with such personas based on behavior of a number of users associated with the persona. The population data may also include actions that can be performed by the current user, or types of content that can be browsed by the current user, in order to associate the user with a persona. The pagination style data may include information on the user interface components of a plurality of pagination styles. In some embodiments, the page customization data repository 160 of FIG. 1 may store relational data associating each of the layout determination factors with one of the pagination styles.

At block 415, the page layout generation component 156 selects a page layout based at least partly on the page customization data. The pagination preferences and device attributes, as well as their corresponding pagination styles, may be used by the page layout generator as layout determination factors, for example, in a weighted formula, in order to select the page layout. In some embodiments, the user behavior analysis component 154 may initially assign default pagination preferences to the user based on a persona and population data, and the page layout generation component 156 may select page layouts for the user based at least partly on the persona and the population data. As the user behavior analysis component 154 identifies pagination preferences from the user's behavior, the page layout generation component 156 may select page layouts based at least partly on the user's pagination preferences. Some embodiments of the process 400 may also include attributes of the requested content in the layout determination factors, as discussed above with respect to FIG. 2. The page layout generation component 156 may select the page layout based on one or more of the content attributes, and may weight a plurality of content attributes to select the page layout. As discussed above, the page layout may include a pagination style, a subset of the requested content to display per page, and user interface elements relating to pagination and navigation. Each of these features of the page layout may be selected individually based on the layout determination factors, in some embodiments. In other embodiments, the features may be grouped together into predetermined page layouts, and may be selected together based on the layout determination factors.

At block 420, the page layout generation component 156 electronically generates a network page having a subset of the requested content presented in the page layout. The network page may include the subset of the requested content arranged according to the selected pagination style, and may also include any user interface elements, such as an index or navigation options. At block 425, the network page is output for presentation to a user, for example, in a mobile browser, mobile application, or non-mobile browser.

At decision block 430, the process 400 determines whether the user has made a request for additional content. For example, if the selected pagination style is segmented pagination, then a request for additional content may be made by the user selecting a new page in the page index or by selecting an option to be presented with a previous or next page. If the selected pagination style is infinite scrolling, then the request for additional content may be made by the user scrolling past the edge of the page. For modified infinite scrolling pagination, the request for additional content may be made by the user selecting the selectable option for more content. For carousel pagination, the request for additional content may be made by the user selecting a directional navigation option.

If, at decision block 430, the process 400 determines that the user has requested additional content, then the process 400 moves to block 435 in which the user pagination preferences data in the user profile stored in association with the user is updated, in some embodiments, to reflect the request for additional content. In other embodiments, rather than update the user profile data in real time, log data may be kept of additional content requests for determining subsequent amounts of content to present to the user, and the log data may be used by the user behavior analysis component 154 to update the user profile at a later time. As discussed above, the page layout generation component 156 may dynamically adjust the amount of additional content loaded upon each subsequent user request (e.g., scrolling to or past the edge of the user interface or selecting an option for more content) based on previous requests stored in the user profile 162. For example, the first time a user requests additional content, the page layout generation component 156 may output a predetermined number of additional items. If the user makes a second request for additional content within a threshold timeframe, the page layout generation component 156 may increase the number of additional items to be output upon the current or subsequent user requests. Conversely, if the user exceeds a threshold amount of time before making a request for additional content, the page layout generation component 156 may reduce the number of additional items to be output upon the current or subsequent user requests.

In some embodiments, the page layout generation component 156 may dynamically adjust the number of additional items output in response to a user request for additional content based on other factors as well. For instance, if the user does not select any items on a page before requesting additional content, the page layout generation component 156 may output a greater number of items in response to the request for additional content than if the user selects above a threshold number of items in the initial subset of presented content. The page layout generation component 156 may dynamically adjust the number of additional items output in response to a user purchasing (or selecting for purchase) an item, changes in the network connection bandwidth or quality of the user device, or changes in the processing capacity of the user device.

At block 445, the page layout generation component 156 electronically generates an updated network page including at least the additional amount of content presented in the page layout. Certain pagination styles, such as infinite scrolling and modified infinite scrolling, may also maintain the presentation of the previously output subset of the requested content. At block 450, the updated network page is output for presentation to a user, and the process 400 loops back to decision block 430.

The process 400 may continue to periodically check for, or may wait for, subsequent user requests for additional content until the user indicates that no additional content is requested, such as by closing their network browser, remaining inactive for a period of time, or otherwise indicating that the current browsing session is over. At that point, the process 400 ends, though if the user resumes their browsing session, the process 400 may resume where it left off.

User-specific pagination can advantageously facilitate a user browsing experience in certain embodiments because explicit and implicit cues in the user's browsing behavior are used to predict what styles of pagination the user finds appealing in the context of certain types of content or certain types of network pages. This may enable the user to more easily locate desired items for selection or purchase from the electronic catalog, as well as presenting a visually pleasing personalized organization.

VI. Example User Interfaces

Figure 5A:
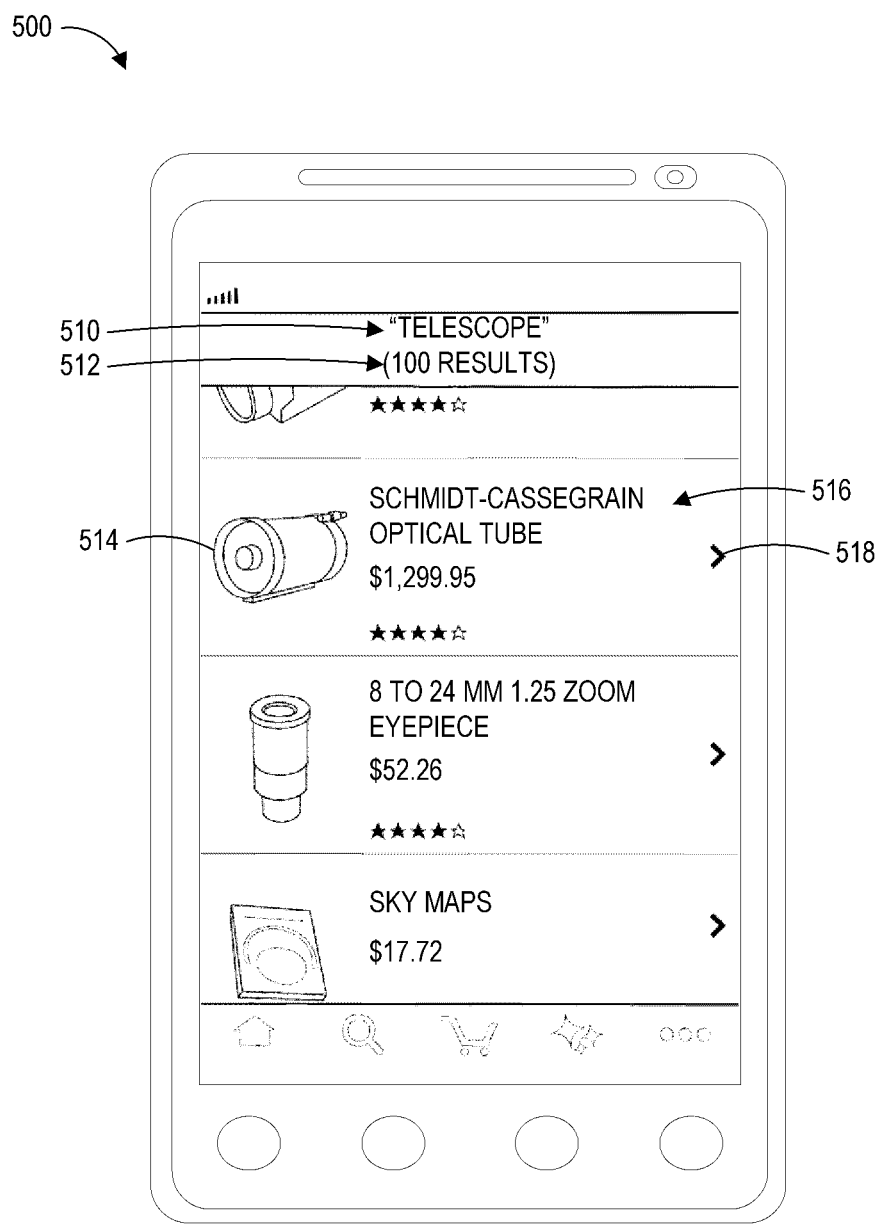
FIG. 5A illustrates an embodiment of a dynamically paginated user interface displayed on a mobile device.

FIG. 5A illustrates an example mobile interface 500 for presenting a dynamically paginated network page to a user in the context of a search for telescope products. The user interface 500 is implemented in a mobile application for illustrative purposes, and a similar user interface could be implemented in a mobile browser. The mobile interface 500 may be suitable for presentation on any device with a relatively smaller screen, such as mobile telephones, PDAs, mp3 players, handheld gaming consoles, etc.

The user interface 500 includes a search keyword 510 and a total number of output search results 512. As discussed above, the total number or amount of output content may be dynamically based on factors such as a relevance score of the search results, attributes of the user's device, or browsing behavior of the user. The user interface 500 includes thumbnail images of items 514 arranged according to an infinite scrolling pagination style. The pagination style may have been selected based on the user behavior and the device attributes. Each item has an associated description 516 including a title, price, and user-generated rating. Though the rating is depicted as being conveyed through five stars, the rating may also be a binary rating (recommended or not recommended by a number of users), a numerical rating, or any other suitable means for conveying a general user opinion about the item 514. The user interface also includes a selectable option for more information 518 associated with each of the items, which may present the user with an item detail page and an option to select the item for purchase.

In another embodiment of a mobile interface, related items may be arranged in threaded pagination, so that related items are visually grouped together within the content. In some embodiments, threaded items may be browsed by side swiping over an item, while the infinite scroll may be browsed by swiping up or down over a touch screen on the user device. To illustrate, the user may swipe up or down to browse the telescope search results, and may swipe sideways over image of the Schmidt-Cassegrain optical tube 514 to be presented with a similar optical tube, such as another Schmidt-Cassegrain optical tube of a different focal length. As another example, a user may be browsing shoes, and a pair of shoes in different colors or sizes may be presented with threaded pagination in the mobile interface, based on user behavior indicating a preference for looking at, purchasing, or otherwise selecting multiple colors or sizes of shoes. As a further example, a video game item may be presented with threaded pagination in the mobile interface to allow a user to scroll multiple versions of the video game available for different platforms.

Figure 5B:
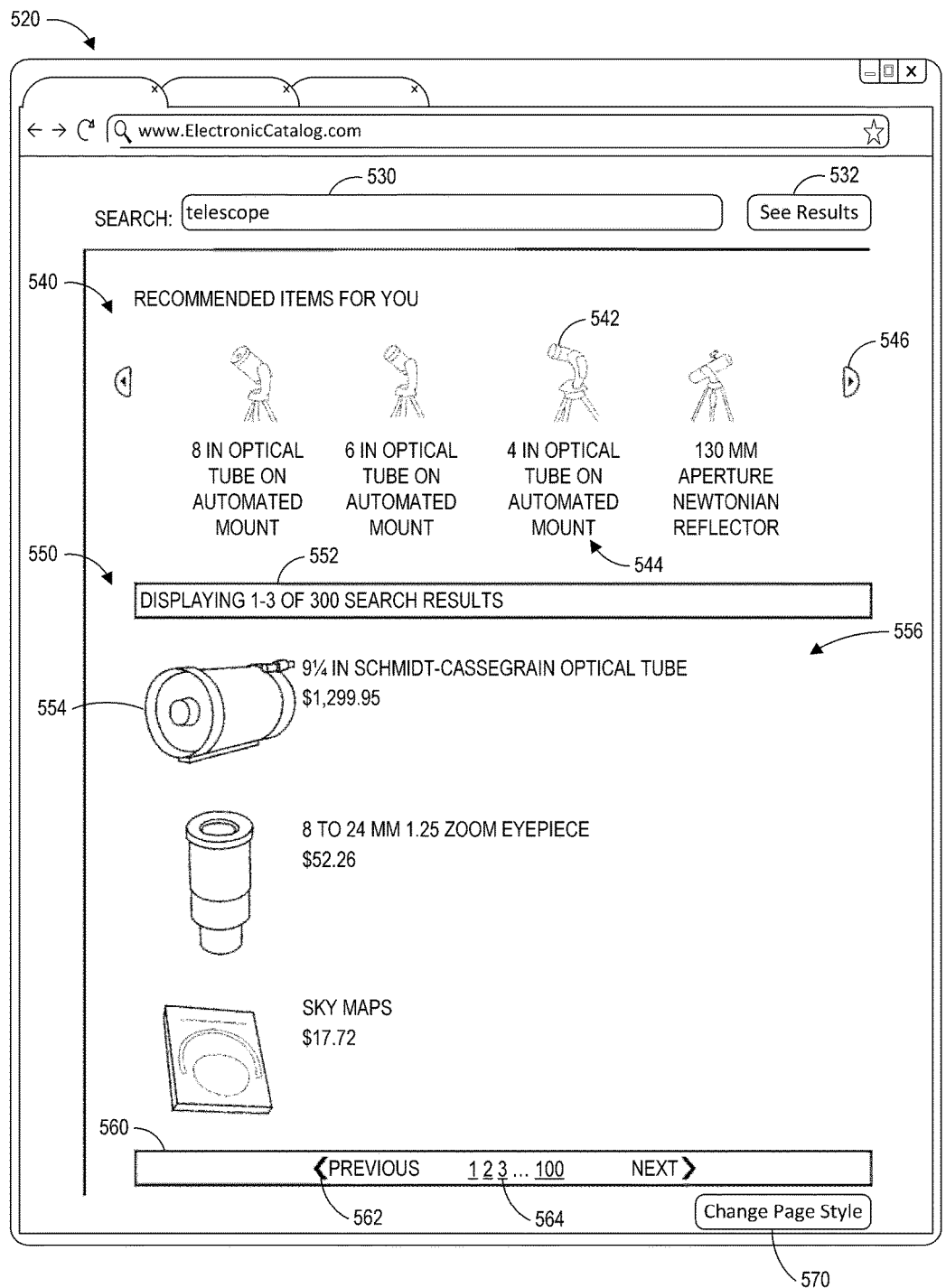
FIG. 5B illustrates an embodiment of a dynamically paginated user interface displayed on a non-mobile computing device.

FIG. 5B illustrates an example non-mobile interface 520 for presenting a dynamically paginated network page to a user in the context of the search for telescope products. The non-mobile interface 520 may be implemented a network browser such as AMAZON SILK®, GOOGLE CHROME®, APPLE® SAFARI®, OPERA™, MOZILLA® FIREFOX®, or MICROSOFT® INTERNET EXPLORER®. The non-mobile interface 520 has a relatively larger area than the mobile interface 500, and may be suitable for presentation on user devices with relatively larger screen sizes, such as personal computers, laptops, or gaming consoles connected to televisions. The non-mobile interface 520 may have been paginated according to pagination preferences expressed through user behavior as well as by the user device type.

The non-mobile interface 520 includes a search field 530 and a selectable option to view the search results 532. In other embodiments, the non-mobile interface may also include a hierarchy of item categories or a listing of sellers to facilitate browsing of the items in the electronic catalog.

The non-mobile interface 520 includes two pagination styles. A carousel pagination style 540 is presented at the top of the interface 520 to display a limited number of recommended items to the user. Each recommended item is represented by a thumbnail image 542 and accompanied by an item title 544. Navigation options 546 may be selected to cycle through the recommended items. In some embodiments, the page layout generation component 156 may have selected the carousel pagination 540 based on user browsing behavior indicating a preference for recommended items presented in a concise, quick-scrolling pagination style.

A segmented pagination portion 550 is presented beneath the carousel pagination portion 540. The segmented pagination portion 550 contains a search result indication 552 for providing the user with information regarding the total number of available search results as well as the current position within the search results. As discussed above, the total number of available search results may be dynamically modified based on layout determination factors such as user browsing behavior and device attributes. The segmented pagination portion 550 also contains a plurality of item image thumbnails 554 accompanied by an item description 556 including an item title and price. Although as illustrated the thumbnails 554 are all approximately the same size, thumbnails of different items may be presented in different sizes. For example, based on user behavior indicating a preference for viewing a high level of detail about sky maps, the image associated with the sky map item may be presented larger or more prominently than the images associated with the optical tube or the eye piece. In some embodiments, the item image thumbnails 554 may provide a user selectable option to be presented with a corresponding item detail page. The segmented pagination portion 550 also contains selectable page index 564 and selectable navigation options 562 to be presented with a previous or a next page.

In order to facilitate presentation of the recommended items to the user, in some embodiments, the carousel 540 of recommended items may remain static while the user navigates through the segmented pagination pages. In certain embodiments, if the user navigates to a new page of the segmented pagination portion 550 without selecting one of the recommended items, the pagination preferences of a profile stored in association with the user may be updated to reflect a preference for only being presented with the search results, and the carousel 540 may not be presented together with subsequent pages of the segmented pagination portion 550. The pagination generation component 156 may, in some embodiments, re-segment the content displayed in the segmented pagination portion 550 to fit within the portion of the user interface 520 which was previously used to present the recommended items in the carousel 540.

In some embodiments, filters (not illustrated) may be presented to the user by the pagination generation component 156, for example, along a side of the page. The filters may relate to attributes of some or all of the paginated items, and selection of the filters by the user may refine the presented items accordingly. In some embodiments, the filters may be presented based on population data indicating a preference for filtering the items or a similar set of items. Specific filters may be selected based on population data or user pagination preferences indicating a preference for filtering the items based on certain attributes. To illustrate, a user may look at, select, purchase, or otherwise interact with green items more than items for another color, indicating a preference for pagination features that highlight green items. Accordingly, a "See Green Items" filter may be presented to the user by the pagination generation component 156, and selection of the filter may narrow the presented items to only display items associated with the color green.

The user interface 520 also includes a selectable change pagination option 570. For example, the selectable change pagination element may allow the user to select a preferred pagination style from a plurality of available pagination styles, to adjust the amount of content presented at once or the total amount of content presented, to add or remove user interface elements, or to rearrange the components of the page layout. In some embodiments, selecting the change pagination style option 570 may present the user with a pagination options interface. In other embodiments, selecting the change pagination style option 570 may activate options on the currently displayed network page that allow the user to modify the page layout directly from the network page. This may be accomplished, for example, by allowing the user to drag and drop features of the page layout into new positions, to close or delete currently displayed features, to type in new numbers corresponding to content amounts, to change a size of user interface elements, or to select new pagination features from a list such as a drop-down menu. Any pagination changes made in the change pagination style interface may be stored in association with the user's pagination preferences, for example, in the page customization data repository 160.

Although not illustrated, in some embodiments the user may be presented with an interface for setting or updating global pagination preferences. For example, the user may be able to identify each device used by the user and may be able to select or arrange a preferred page layout for each device. The user may also be able to associate specific types of content with a preferred page layout, such as by specifying that the user would like to be presented with telescope products ten at a time using a segmented pagination style, and the user may additionally specify the types of information associated with the telescope products which should be displayed on the page, such as title, price, and rating. These pagination settings may be stored in association with the user's profile in the page customization data repository 160.

VII. Additional Embodiments

As described above with respect to FIG. 1, the dynamic pagination service 150 can dynamically adjust the amount of content presented in response to a user request. Similarly, an adaptive data retrieval service may operate in the context of web services to mediate an amount of content sent from a data service to a requesting system. To illustrate, a requesting system may be a network service such as a network site, and the data service may be a content storage service that provides the network site with content upon user requests. In one embodiment, based at least partly on factors such as a type of requesting network site, bandwidth of the requesting network site, or user profile data of the specific user making the request for content to the network site, the adaptive data retrieval service may mediate the flow of information between the requesting network site and the storage service. The adaptive data retrieval service may, in some embodiments, determine a subset of the requested content to output to the requesting network site, and may only retrieve that subset of requested content from the storage service. In another embodiment, the adaptive data retrieval service may retrieve all of the requested content from the storage service, and may store the content to send in segments to the requesting network site. The adaptive data retrieval service may also make pagination decisions regarding how to display the data based on the layout determination factors discussed above, as well as based on attributes of the requesting network site.

To illustrate, for network pages with a significant amount of user-generated content, such as social networking or social bookmarking network sites, the adaptive data retrieval service may select infinite scrolling to handle content that is being generated every second. On such network sites, users may not expect to be presented with, or browse, all content on a page because the content is updated too frequently. Infinite scrolling exposes as much recent content as possible to the user and allows for chronological scrolling through older content. Accordingly, the adaptive data retrieval service may select a pagination style of infinite scrolling, and may change the pagination style to a modified pagination style in response to a detected decrease in bandwidth for the requesting network site. The adaptive data retrieval service may select an initial amount of requested content to display on the requesting social networking site based on the bandwidth or based on other factors such as a timeframe of trending, relevant, or otherwise desired social networking data. As another example, if the requesting network site is a news site, the adaptive data retrieval service may select a segmented pagination style and may output subsets of a requested news article on each page, wherein the size of the subsets is based at least partly on a bandwidth of the requesting news site.

In some embodiments, the adaptive data retrieval service may be incorporated into the storage service. In other embodiments, the adaptive data retrieval service may run as a virtual machine instance in a network infrastructure service, which includes the requesting network service and the storage service. In another embodiment the adaptive data retrieval service may be incorporated into a search service used to index and retrieve data stored in the storage service. In yet other embodiments, the adaptive data retrieval service may be a standalone appliance.

In other embodiments, the dynamic pagination service 150 can be utilized in other network applications, such as a database management system. In response to a request from the user for requested content includes a database query or report generation request, the dynamic pagination service 150 can dynamically adjust the amount of content delivered to the user or the way in which the contact is paginated. In some embodiments, the dynamic pagination service 150 can dynamically paginate the generation of data sets from spreadsheet queries. In such embodiments, components of FIG. 1 such as the catalog service 140 and the search service 130 may be replaced by other components such as a database or spreadsheet. Users of the database or spreadsheet may be identified through log in or authentication, and pagination preferences may be tracked. In some embodiments, the user pagination preferences may be obtained through interaction with other network applications in addition to or instead of the database or spreadsheet.

VIII. Conclusion

Many embodiments of systems and processes have been described for generating user pagination preference data and using that data to generate and/or present network pages. Among many other features described herein, these systems and processes can dynamically collect data representing a user's preferences respecting specific layout determination factors, and can store this data in association with the user. The systems and processes can also make use of that data to provide the user with a personalized user interface which will provide the user with a page layout tailored to that specific user's browsing habits. Moreover, data representing the attributes of the requested content or the user device may further contribute to generating a page layout which optimally displays the requested content to the user.

IX. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Further, the headings used herein should not be used to limit the scope of the claims, as they merely illustrate example embodiments.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in physical computer hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A computer-implemented method comprising:
as implemented by one or more computing devices configured with specific executable instructions,
receiving a request from a user for requested content associated with a content attribute, the requested content comprising a plurality of items available for selection in an electronic catalog;
analyzing pagination preference cues in past behavior of the user with respect to previously displayed items each comprising a representation of a product or service available for selection in the electronic catalog, the pagination preference cues comprising patterns in the past user behavior with respect to browsing displayed groupings of the previously displayed items;
based on the analyzing of the pagination preference cues, building a map of layout determination factors associating attributes of content or network pages with a plurality of pagination styles, each of the pagination styles including a style of dividing content into segments and a layout arranging for the segments of the divided content and navigation features for navigating the segments of the divided content, wherein building the map comprises personalizing a layout determination factor associating the content attribute with a pagination style of the plurality of pagination styles according to the pagination preference cues in the past behavior of the user;
accessing user profile data comprising the layout determination factor from the map;

generating a personalized page layout for the requested content based at least partly on the layout determination factor, the personalized page layout comprising:
- a segment of the requested content having been divided into segments according to the style of dividing content of the pagination style, the segment of the requested content arranged according to the layout of the pagination style, and
- a selectable pagination user interface element according to the associated navigation features of the pagination style; and electronically generating a network page for presentation to a user, the network page comprising the selectable pagination user interface element and the subset of the requested content arranged according to the at least one pagination style.

2. The computer-implemented method of claim 1, wherein the layout determination factor comprise at least one of current session data, browsing history, a click history, a purchase history, or a pagination selection of a user or a population of users.

3. The computer-implemented method of claim 1, wherein the at least one pagination style comprises at least one of segmented pagination, infinite scrolling, modified infinite scrolling, carousel pagination, or threaded pagination.

4. The computer-implemented method of claim 1, wherein the page customization data further comprises device profile data, the device profile data comprising an attribute of a user device requesting the requested content.

5. A system comprising:
a data store configured to store data regarding a plurality of pagination styles each including a style of dividing content into segments, a layout for arranging the segments of the divided content, and a navigation feature for navigating the segments of the divided content; and
a computing device in communication with the data store, the computing device configured to at least:
  track interactions of a user with respect to the contents of a network page of an electronic catalog, the contents comprising a plurality of items displayed to the user via the network page, the plurality of items each comprising a representation of a product or service available for selection in the electronic catalog;
  identify a user pagination preference based at least partly on identifying a pattern in the tracked interactions of the user with respect to browsing groupings of the plurality of items displayed to the user, the user pagination preference comprising an association between a content attribute and a pagination style of the plurality of pagination styles;
  receive a request from the user for requested content associated with the content attribute;
  select a page layout based at least partly on the identified user pagination preference, the page layout comprising the pagination style associated with the content attribute based on the pattern in the tracked interactions of the user; and
  electronically generate a personalized network page for presentation to the user, the personalized network page comprising:
    a segment of the requested content having been divided into segments according to the style of dividing content of the at pagination style, the segment of the requested content arranged according to the layout of the pagination style, and
    the navigation feature of the pagination style.

6. The system of claim 5, wherein the network application comprises an electronic catalog, and wherein the requested content comprises information regarding a plurality of items available for selection in the electronic catalog.

7. The system of claim 5, wherein the data store is further configured to store a layout determination factor.

8. The system of claim 7, wherein the layout determination factor includes at least one of a user device attribute, a requested content attribute, a population pagination preference determined from behavior of a population of users, or the user pagination preference.

9. The system of claim 7, wherein the computing device is further configured to at least select the page layout based at least partly on the identified user pagination preference and the layout determination factor.

10. The system of claim 5, wherein the computing device is further configured to at least identify the user pagination preference based at least partly on an action of the user that explicitly indicates the pagination preference.

11. The system of claim 10, wherein the action of the user that explicitly indicates the pagination preference is a selection by the user of a selectable option to view more or less content than the subset of the requested content on the network page.

12. The system of claim 10, wherein the action of the user that explicitly indicates the pagination preference is a selection by the user of a selectable change pagination option.

13. The system of claim 5, wherein computing device is further configured to at least identify the user pagination preference based at least partly on an action of the user that implicitly indicates the pagination preference.

14. The system of claim 13, wherein the action of the user that implicitly indicates the pagination preference is an interaction with an item of the plurality of items displayed to the user.

15. The system of claim 5, wherein the user pagination preference is determined from at least one of current session data, browsing history, a click history, a purchase history, or pagination selections.

16. The system of claim 5, wherein the computing device is further configured to at least select the page layout based at least partly on at least one of an attribute of a user device or an attribute of the requested content.

17. The system of claim 5, wherein the network application comprises a database management system, and wherein the request from the user for requested content comprises a database query or report generation request.

18. A non-transitory computer storage medium storing computer executable instructions that, when executed by one or more computer systems, configure the one or more computer systems to perform operations comprising:
  receiving a user request for requested content, the content comprising a plurality of items each comprising a representation of a product or service available for selection in an interactive network site;
  accessing information regarding an attribute of the content;
  accessing page customization data comprising a plurality of pagination styles each including a style of dividing content into segments, a layout for arranging the segments of the divided content, and a navigation feature for navigating the segments of the divided content;
  accessing a pagination preference of a user determined based at least partly on personalized analysis identifying a pattern in behavior of the user with respect to browsing previously displayed items of the plurality of items displayed to the user on one or more network pages, the user pagination preference comprising an association between the content attribute and a pagination style of the plurality of pagination styles;

selecting a page layout based at least partly on the attribute of the content and on the pagination preference of the user, the page layout comprising:
- a segment of the requested content having been divided into segments according to the style of dividing content of the pagination style, the segment of the requested content arranged according to the layout of the pagination style, and
- a selectable pagination user interface element including the navigation feature of the pagination style; and electronically generating a network page for presentation to the user, the network page comprising the selectable pagination user interface element and the subset of the requested content arranged according to the at least one pagination style.

19. The non-transitory physical computer storage of claim 18, wherein the information regarding attributes of the plurality of items comprises a plurality of categories, wherein at least some of the plurality of items are associated with at least one of the plurality of categories.

20. The non-transitory physical computer storage of claim 18, wherein the information regarding attributes of the plurality of items comprises at least one of: item color, item size, item variations, filters available for selection in user filtering of the requested content, item image size, or a level of detail present in an item image.

21. The non-transitory physical computer storage of claim 18, wherein the operations further comprises outputting the network page for presentation to the user in a network browser.

22. The non-transitory physical computer storage of claim 18, wherein the page customization data further comprises an attribute of a user device.

23. The non-transitory physical computer storage of claim 22, wherein the operations further comprise selecting the page customization data based at least partly on the attribute of the user device.

24. The non-transitory physical computer storage of claim 18, wherein the operations further comprise tracking the behavior of the user with respect to the previously displayed items.

25. The non-transitory physical computer storage of claim 24, wherein the operations further comprise analyzing the behavior of the user with respect to the previously displayed items to identify the pagination preference of the user.

* * * * *